United States Patent [19]

Danver et al.

[11] Patent Number: 5,155,548
[45] Date of Patent: Oct. 13, 1992

[54] PASSIVE FIBER OPTIC SENSOR WITH OMNIDIRECTIONAL ACOUSTIC SENSOR AND ACCELEROMETER

[75] Inventors: Bruce A. Danver, Los Angeles County; Jeffrey D. Lastofka, Agoura Hills; Michael R. Layton, Clayton, all of Calif.

[73] Assignee: Litton Systems, Inc., Beverly Hills, Calif.

[21] Appl. No.: 526,815

[22] Filed: May 22, 1990

[51] Int. Cl.⁵ .............................................. G01B 9/02
[52] U.S. Cl. .................................. 356/345; 356/350; 73/653; 367/149; 250/227.19
[58] Field of Search ............... 356/345, 349, 350, 352, 356/44; 73/653, 705; 250/227.19, 227.27; 367/149

[56] References Cited

U.S. PATENT DOCUMENTS

| | | | |
|---|---|---|---|
| 3,645,603 | 2/1972 | Smith | 350/149 |
| 3,990,036 | 11/1976 | Savit | 340/15.5 |
| 4,162,397 | 7/1979 | Bucaro et al. | 250/199 |
| 4,166,946 | 9/1979 | Chown et al. | 250/199 |
| 4,294,513 | 10/1981 | Nelson et al. | 350/96.29 |
| 4,301,543 | 11/1981 | Palmer | 455/612 |

(List continued on next page.)

FOREIGN PATENT DOCUMENTS

| | | | |
|---|---|---|---|
| 3224775 | 1/1983 | Fed. Rep. of Germany | 350/96.16 X |
| 2493188 | 7/1981 | France | 350/96.16 X |
| 0023345 | 2/1981 | Japan | 250/227 X |
| 58-211119 | 12/1983 | Japan | 350/96.16 X |
| WO79/00377 | 6/1979 | PCT Int'l Appl. | 250/227 X |
| WO83/03684 | 4/1982 | PCT Int'l Appl. | 356/350 X |
| WO85/00221 | 1/1983 | PCT Int'l Appl. | 356/350 X |
| WO93/02496 | 6/1983 | PCT Int'l Appl. | 356/350 X |
| 2096762 | 10/1982 | United Kingdom | 250/227 X |

OTHER PUBLICATIONS

Brooks et al., "Coherence Multiplexing of Fiber-Optic Interferometric Sensors", Journal of Lightwave Technology, vol. LT-3, No. 5, Oct. 1985, pp. 1062-1071.

Jackson et al., "Optical Fiber Delay-Line Signal Processing", IEEE Transactions on Microwave Theory and Techniques, vol. MTT-33, No. 3, Mar. 1985, pp. 193-210.

Davis, "Fiber Optic Sensors: An Overview", Pro. of SPIE, Fiber Optic and Laser Sensors II, vol. 478, May 1984, pp. 12-18.

Pavlath, "Applications of All Fiber Technology to Sensors", Proc. SPIE, (Int. Soc. Opt. Eng.), vol. 412, Apr. 5-7, 1983, pp. 70-79.

Dandridge et al., "Homodyne Demodulation Scheme (List continued on next page.)

*Primary Examiner*—Samuel A. Turner
*Assistant Examiner*—LaCharles P. Keesee
*Attorney, Agent, or Firm*—Lynn & Lynn

[57] ABSTRACT

A mismatched path length fiber optic interferometer is optically coupled to an optical fiber and configured to form an omnidirectional acoustic sensor. A second mismatched path length fiber optic interferometer is optically coupled to the optical fiber and configured as a first gradient sensor. A second fiber optic gradient sensor is also optically coupled to the optical fiber. A detector optically coupled to the omnidirectional acoustic sensor and to the gradient sensors converts optical signals output therefrom to electrical signals indicative of the magnitude and direction of changes in an acoustic field. The omnidirectional acoustic sensor may include a length of optical fiber wrapped around the housing while the gradient sensors are mounted inside the housing. The housing preferably has a volume that is adjustable for controlling the buoyancy thereof. Each gradient sensor preferably comprises a pair of mandrels formed to enclose chambers. Optical fiber coils are formed on the mandrels. Both the chambers are filled with a fluid and placed in fluid communication through a tube that defines a sensing axis between the mandrels such that acceleration of the housing along the first sensing axis causes a fluid pressure differential on the first and second optical fiber coils.

20 Claims, 3 Drawing Sheets

U.S. PATENT DOCUMENTS

| | | | |
|---|---|---|---|
| 4,307,933 | 12/1981 | Palmer et al. | 455/612 |
| 4,307,937 | 12/1981 | Gordon | 350/96.29 |
| 4,322,829 | 3/1982 | Davis, Jr. et al. | 367/178 |
| 4,360,272 | 11/1982 | Schmadel et al. | 356/352 |
| 4,368,981 | 1/1983 | Ozeki | 356/352 |
| 4,378,143 | 3/1983 | Winzer | 350/96.15 |
| 4,442,350 | 4/1984 | Rashleigh | 250/227 |
| 4,443,700 | 4/1984 | Macedo et al. | 250/227 |
| 4,488,040 | 12/1984 | Rowe | 250/227 |
| 4,490,163 | 12/1984 | Jochem et al. | 65/4.21 |
| 4,493,528 | 1/1985 | Shaw et al. | 350/96.29 |
| 4,505,587 | 3/1985 | Haus et al. | 356/345 |
| 4,525,818 | 6/1985 | Cielo et al. | 367/149 |
| 4,530,603 | 7/1985 | Shaw et al. | 356/345 |
| 4,534,222 | 8/1985 | Finch et al. | 73/653 |
| 4,545,253 | 10/1985 | Avicola | 73/655 |
| 4,547,869 | 10/1985 | Savit | 367/149 |
| 4,552,457 | 11/1985 | Giallorenzi et al. | 356/345 |
| 4,570,248 | 2/1986 | Assord | 367/149 |
| 4,588,255 | 5/1986 | Tur et al. | 350/96.15 |
| 4,588,296 | 5/1986 | Cahill et al. | 356/350 |
| 4,593,385 | 6/1986 | Chamuel | 367/149 |
| 4,606,020 | 8/1986 | Ruffin | 370/3 |
| 4,630,885 | 12/1986 | Haavisto | 350/96.15 |
| 4,632,551 | 12/1986 | Pavlath | 356/345 |
| 4,633,170 | 12/1986 | Burns | 324/77 K |
| 4,648,082 | 3/1987 | Savit | 367/149 |
| 4,648,083 | 3/1987 | Giallorenzi | 367/149 |
| 4,653,916 | 3/1987 | Henning et al. | 356/345 |
| 4,671,113 | 6/1987 | Carome | 73/516 |
| 4,676,583 | 6/1987 | Hicks, Jr. | 350/96.15 |
| 4,676,585 | 6/1987 | Shaw et al. | 350/96.15 |
| 4,697,876 | 10/1987 | Dyott | 350/96.29 |
| 4,697,926 | 10/1987 | Youngquist et al. | 356/345 |
| 4,751,690 | 6/1988 | Krueger | 367/149 |
| 4,799,752 | 1/1989 | Carome | 350/96.15 |
| 4,848,906 | 7/1989 | Layton | 356/345 |
| 4,939,447 | 7/1990 | Bohnert et al. | 324/96 |
| 4,951,271 | 8/1990 | Garrett et al. | 367/141 |

OTHER PUBLICATIONS for Fiber Optic Sensors using Phase Generated Carrier", IEEE Journal of Quantum Electronics, vol. QE-18, No. 10, Oct. 1982, pp. 1647-1653.

Kersey et al., "Demodulating Scheme Fibre Interferometric Sensor Employing Laser Frequency Switching", Electronics Letters, vol. 19, No. 3, Feb. 13, 1983, pp. 102-103.

Tur et al., "Fiber-Optic Signal Processor with Applications to Matrix-Vector Multiplication and Lattice Filtering", Optics Letters, vol. 7, No. 9, Sep. 1982, pp. 463-465.

Digonnet et al., "Analysis of a Tunable Single Mode Optical Fiber Coupler", IEEE Journal of Quantum Electronics, vol. QE-18, No. 4, Apr. 1982, pp. 746-754.

Giallorenzi et al., "Optical Fiber Sensor Technology", IEEE Transactions on Microwave Theory and Techniques, vol. MTT-30, No. 4, Apr. 1982, pp. 472-511.

Davis, "An Introduction to Fiber Optic Sensors", Laser Focus/Fiber Optic Tech., vol. 18, No. 2, Feb. 1982, pp. 112-118.

Jarzynski et al., "Frequency Response of Interferometric Fiber-Optic Coil Hydrophones", Journal of Acoust. Soc. Am., vol. 69, No. 6, Jun. 1981, pp. 1799-1808.

Nelson et al., "Passive Multiplexing Techniques for Fiber Optic Sensor Systems", I.F.O.C., Mar. 1981, pp. 27-30.

Nelson et al., "Passive Multiplexing System for Fiber Optic Sensors", Applied Optics, vol. 19, No. 17, Sep. 1980, pp. 2917-2920.

Sheem et al., "Wavelength Monitoring of Single-Mode Diode Laser Using Guided Wave Interferometer", Optics Letters, May 1980, vol. 5, No. 5, pp. 179-181.

Bergh et al., "Single-Mode Fibre Optic Directional Coupler", Mar. 27, 1980, Electronics Letters, vol. 16, No. 7, pp. 260-261.

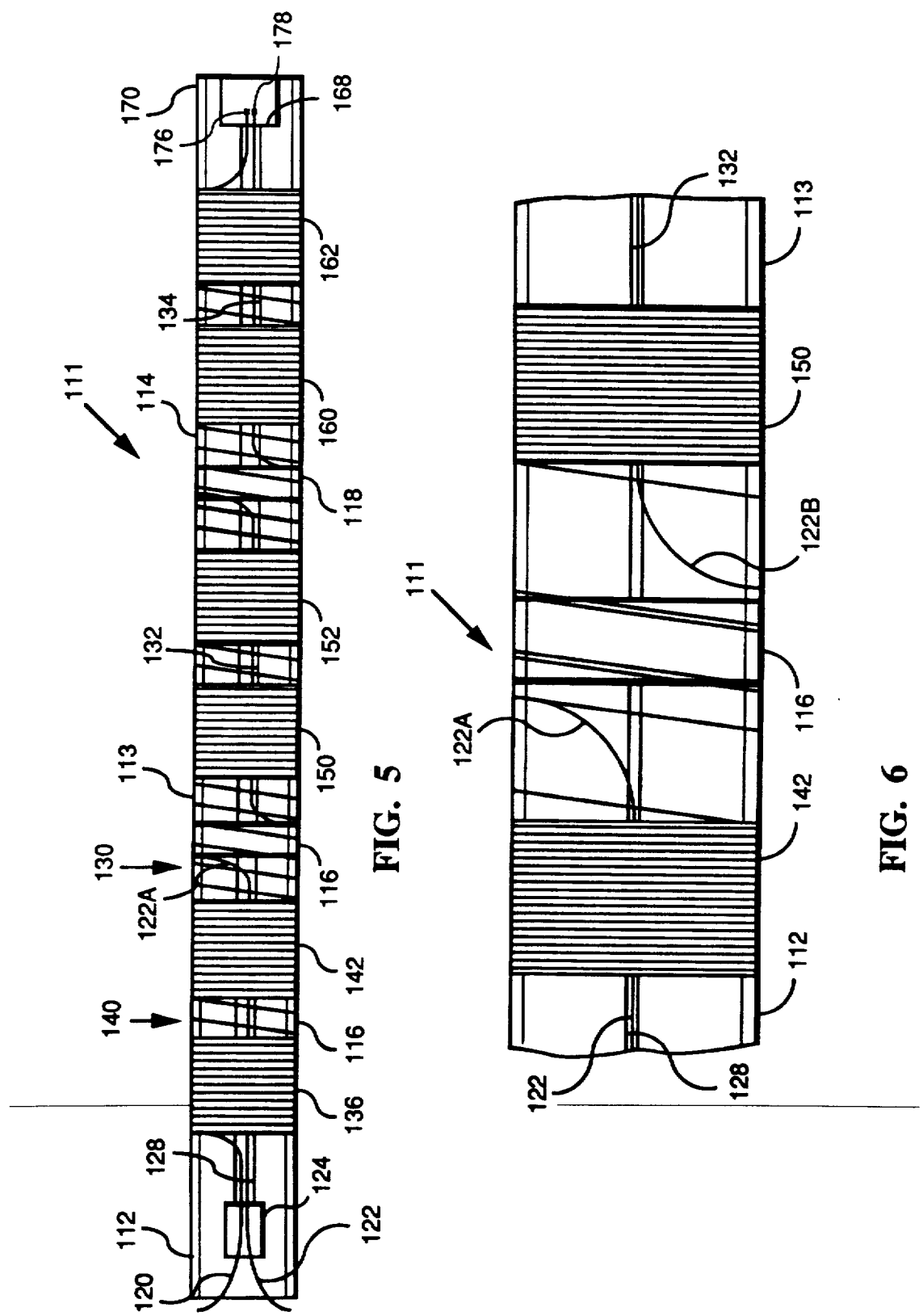

PASSIVE FIBER OPTIC SENSOR WITH OMNIDIRECTIONAL ACOUSTIC SENSOR AND ACCELEROMETER

BACKGROUND OF THE INVENTION

This invention relates generally to apparatus and methods for sensing physical phenomena and particularly to fiber optic sensing systems. This invention relates particularly to fiber optic sensors that respond to changes in a selected field quantity such as pressure, magnetic field, electric field, etc. Still more particularly, this invention relates to fiber optic interferometric sensors that respond to underwater perturbations such as acoustic wavefronts by producing a phase difference in two light beams propagated by fiber optic material.

Optical fibers can be made sensitive to a large number of physical phenomena, such as acoustic waves and temperature fluctuations. An optical fiber exposed to such phenomena changes the amplitude, phase or polarization of light guided by the fiber. Optical fibers have been considered for use as sensing elements in devices such as microphones, hydrophones, magnetometers, accelerometers and electric current sensors.

A hydrophone array or acoustic sensor array may be formed as an integral, self-contained linear array of hydrophones on a single cable. Conventionally, such an array is made up of electromechanical transducer elements, principally piezoelectric devices, which generate electrical signals in response to pressure variations. These conventional sensors typically are active devices that require many electrical wires or cables. These sensors have the disadvantage of being susceptible to electrical noise and signal cross talk.

Fiber optic Mach-Zehnder and Michelson and interferometers respond to the phenomenon being sensed by producing phase differences in interfering light waves guided by optical fibers. Detecting phase changes in the waves permits quantitative measurements to be made on the physical quantity being monitored.

A fiber optic Mach-Zehnder interferometer typically has a reference arm comprising a first length of optical fiber and a sensing arm comprising a second length of optical fiber. The sensing arm is exposed to the physical parameter to be measured, such as an acoustic wavefront, while the reference arm is isolated from changes in the parameter. When the Mach-Zehnder interferometer is used as an acoustic sensor, acoustic wavefronts change the optical length of the sensing arm as a function of the acoustic wave pressure amplitude. An optical coupler divides a light signal between the two arms. The signals are recombined after they have propagated through the reference and sensing arms, and the phase difference of the signals is monitored. Since the signals in the reference and sensing arms had a definite phase relation when they were introduced into the arms, changes in the phase difference are indicative of changes in the physical parameter to which the sensing arm was exposed.

A Michelson interferometer also has a sensing arm and a reference arm that propagate sensing and reference signals, respectively. However, in the Michelson interferometer these arms terminate in mirrors that cause the sensing and reference signals to traverse their respective optical paths twice before being combined to produce an interference pattern.

A hydrophone array is typically towed behind a ship. Towing causes vortexes, bubbles and other disturbances in the water that cause conventional hydrophones to give erroneous outputs. Most fiber optic hydrophones employ a matched Mach-Zehnder interferometer in the acoustic sensing system. One arm of the interferometer senses the acoustic field while the other arm is a reference. With a matched interferometer the reference arm can be placed next to the sensing arm so that any mechanical stresses applied to the sensing arm will also be applied to the reference arm.

A coating is applied to the jacket of the optical fiber in the reference arm to keep it from being sensitive to the acoustic field being measured. However, attempting to make the optical fiber in one arm of the interferometer insensitive to a particular physical parameter may also change other properties of the optical fiber. For example, coating the fiber jacket of one arm of the interferometer to change its sensitivity to the acoustic field changes the sensitivity of the optical fiber to acceleration. In such cases the effect of having matched arm lengths is not an advantage. Another difficulty with the matched pathlength interferometer is that coating on the fiber jackets do not completely eliminate the sensitivity of the fiber to the acoustic field, but leave a residual sensitivity that affets the performance of the sensor.

SUMMARY OF THE INVENTION

The present invention is a passive fiber optic acoustic sensing system, which means that all active components such as amplifiers, demultiplexers and demodulators that may be used with the fiber optic sensors are remotely located from the sensors. The active components preferably are centrally located. The sensor according to the present invention may therefore be smaller and simpler than previously known devices.

A fiber optic acoustic sensing system according to the present invention comprises a first optical fiber and an optical signal source arranged to introduce optical signals into the first optical fiber. A first mismatched path length fiber optic interferometer is optically coupled to the first optical fiber and configured to form an omnidirectional acoustic sensor. A second mismatched path length fiber optic interferometer is optically coupled to the first optical fiber and configured to form a first hydrophone having a first sensing axis. A third mismatched path length fiber optic interferometer optically is coupled to the first optic fiber and configured to form a second hydrophone for producing optical signals indicative of having a second sensing axis. A detector may be optically coupled to the omnidirectional acoustic sensor and to the first and second hydrophones for converting optical signals output therefrom to electrical signals indicative of the magnitude and direction of changes in an acoustic field.

The fiber optic acoustic sensing system according to the present invention further comprises a housing, and the omnidirectional acoustic sensor may be formed to include a length of optical fiber wrapped around the housing with the first and second hydrophones being affixed inside the housing. The housing preferably has a volume that is adjustable for controlling the buoyancy thereof.

Each hydrophone preferably comprises a first mandrel affixed inside the housing and formed to enclose a first chamber and a first optical fiber coil formed on the first mandrel. A second mandrel is placed in the housing and formed to enclose a second chamber. A second optical fiber coil is formed on the second mandrel and both the first and second chambers are filled with a fluid. The optical signals that propagate through the first optical fiber coil preferably have a longer optical path length than optical signals that propagate through the second optical fiber.

The chambers are preferably in fluid communication through a tube that defines a sensing axis between the mandrels such that acceleration of the housing along the first sensing axis causes a fluid pressure differential on the first and second optical fiber coils. The hydrophones further include means for introducing optical signals into the first and second optical fibers and means for combining optical signals output from the first and second optical fibers to produce a signal indicative of the component of the acoustic field along the first sensing axis.

The fiber optic acoustic sensing system according to the present invention further comprises means for compensating for differential thermal expansion of the mandrels and the fluid that fills the first and second chambers.

The present invention permits the construction of a fiber optic acoustic sensing system that is less massive than previous designs that having a sensing mandrel surrounded by a fluid. The present invention has the further advantage of isolating the optical fibers from the fill fluid, which relaxes the environmental tolerance required of the optical components.

The mandrels in each hydrophone preferably are connected by an off center tube, which allows two hydrophones to be nested together in a symmetrical arrangement in a compact housing.

BRIEF DESCRIPTION OF THE DRAWINGS

FIGS. 5 and 6 illustrate an omnidirectional sensor structure that may be included in the fiber optic sensing system of FIG. 1.

DESCRIPTION OF THE PREFERRED EMBODIMENT

Figure 1:
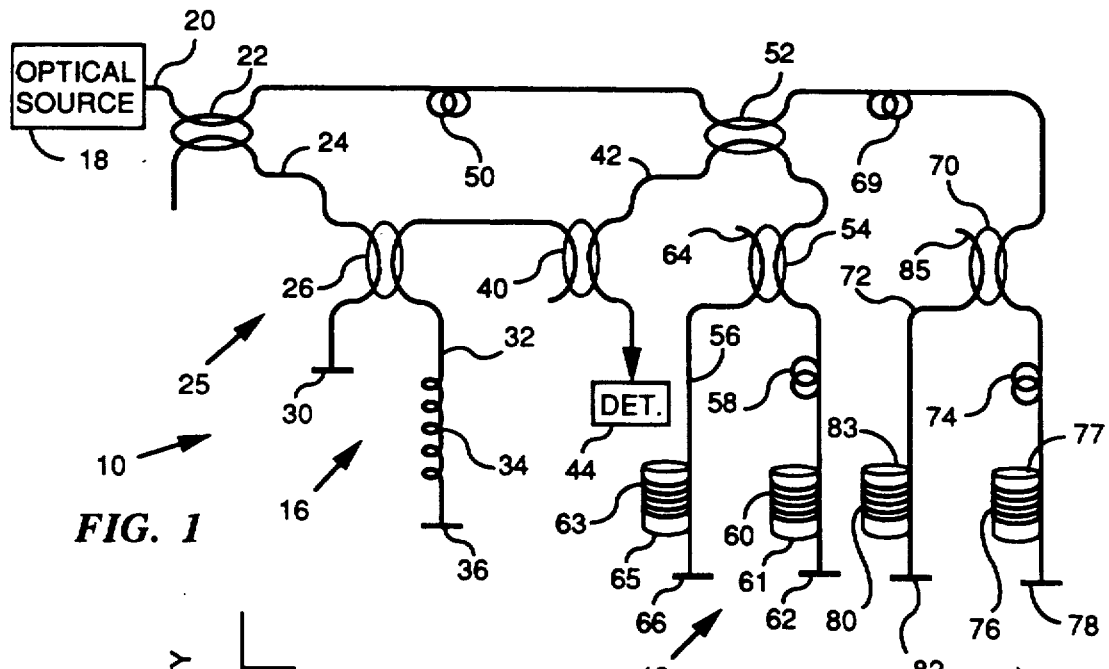
FIG. 1 is a schematic illustration of the fiber optic sensing system according to the present invention including two fiber optic accelerometers and one omnidirectional sensor.
Figure 2:
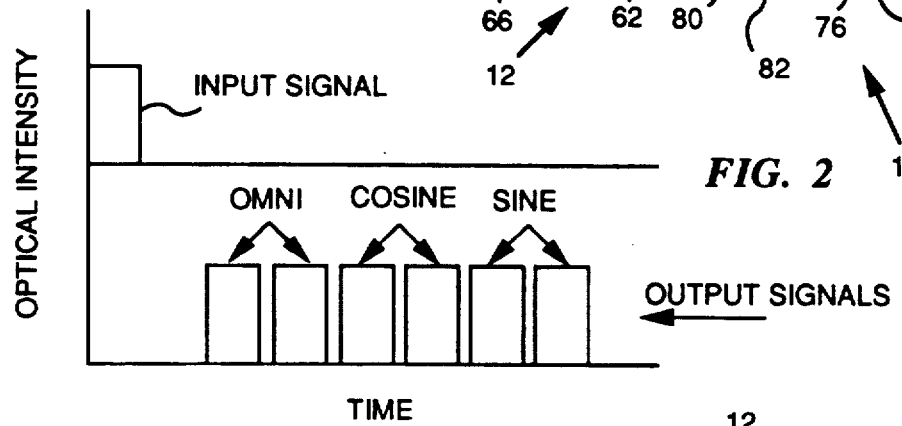
FIG. 2 graphically illustrates optical intensities input to and output from fiber optic sensors included in the fiber optic sensing system of FIG. 1.
Figure 3:
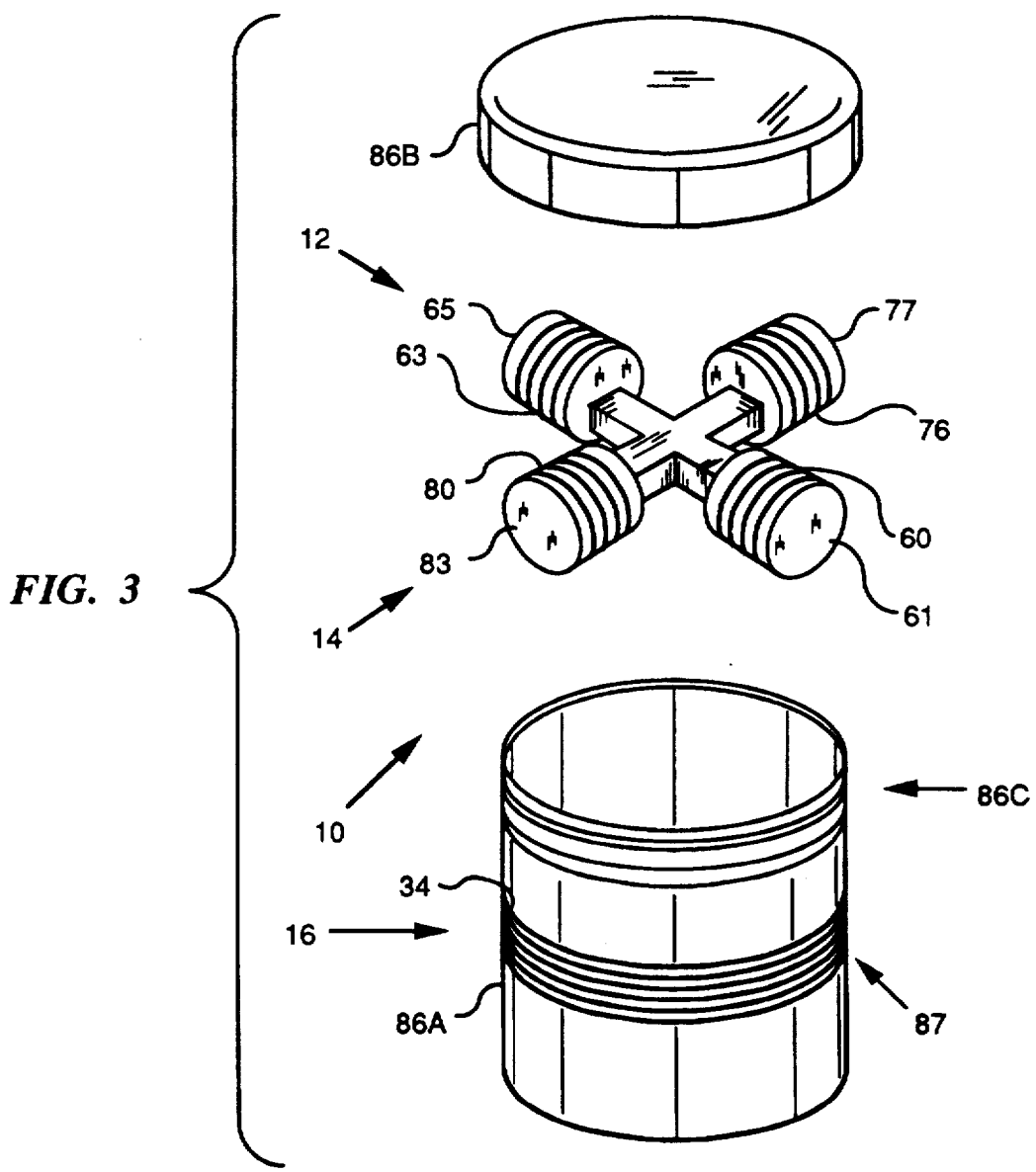
FIG. 3 is an exploded perspective view of the present invention showing case and sensing elements that may be placed inside the case.

Referring to FIGS. 1 and 3, a passive fiber optic sensing system 10 includes a pair of fiber optic accelerometers 12 and 14 and a fiber optic omnidirectional hydrophone 16. The fiber optic accelerometers 12 and 14 and the omnidirectional hydrophone 16 are connected to an optical signal source 18, which may be a laser diode, to receive signals therefrom.

The optical signal source 18 provides optical signals to an optical fiber 20, which guides the input signals to a fiber optic coupler 22. A suitable structure for the fiber optic coupler is described in the Mar. 29, 1980 issue of *Electronics Letters*, Vol. 18, No. 18. pp. 260-261. The fiber optic coupler structure is also described in U.S. Pat. No. 4,493,518 issued Jan. 15, 1985 to Shaw et al. and assigned to the Board of Trustees of the Leland Stanford Junior University. The disclosure of U.S. Pat. No. 4,493,518 is hereby incorporated by reference into this disclosure. The present invention includes several fiber optic couplers, all of which may be formed according to the disclosure of U.S. Pat. No. 4,493,518.

The basic principles of fiber optic gradient accelerometers are explained in U.S. Pat. No. 4,799,752, issued Jan. 24, 1989 to Carome, which is assigned to Litton Systems, Inc., owner of the present invention. The disclosure of that patent is hereby incorporated by reference into the present disclosure.

The coupler 22 couples a first portion of the light input thereto into an optical fiber 24, which guides optical signals to the omnidirectional hydrophone 16. As shown in FIG. 1, the omnidirectional hydrophone 16 may comprise a Michelson interferometer 26. The Michelson interferometer 26 includes a fiber optic coupler 26, a first mirror 30, an optical fiber 32 that includes a sensing coil 34, and a second mirror 36. A first portion of the light input to the fiber optic coupler 26 remains in the optical fiber 24 and propagates to the mirror 30, which is formed at an end of the optical fiber 24. The mirror 30 reflects the light incident thereon back to the fiber optic coupler 26.

A second portion of the light input to the fiber optic coupler 26 from the optical fiber cross couples into the optical fiber 32. This cross coupled light propagates in the optical fiber 32 through the sensing coil 34 to the mirror 36, which reflects the light incident thereon back to the fiber optic coupler 26. The light reflected from the mirror 36 thus propagates twice through the sensing coil 36.

Part of the light reflected from the mirror 36 remains in the optical fiber 32 and propagates toward a fiber optic coupler 40. Part of the light reflected from the mirror 30 cross couples in the fiber optic coupler 26 into the optical fiber 32 and also propagates toward the fiber optic coupler 40. The light reflected from the mirror 30 and cross coupled into the fiber 32 forms the reference beam for the Michelson interferometer while the light that reflects from the mirror 36 and remains in the optical fiber 32 forms the sensing beam.

The combined sensing and reference signals propagate to the fiber optic coupler 40, which cross-couples a portion of light incident on it from the optical fiber 32 into an optical fiber 42. The optical fiber then guides the signal output form the Michelson interferometer to a detector 44. The sensing coil 34 is sensitive to changes in the physical parameter, such as acoustic pressure, that the fiber optic sensing system 10 is designed to monitor. Changes in the physical parameter cause a phase shift in the optical signals in the sensing coils 34. The reference and sensing signals from the Michelson interferometer 25 combine in the fiber optic coupler 26 and form an interference pattern that may be detected. The sensing and reference signals have a definite phase relationship when they are input to the Michelson interferometer 25, and the signals form an interference pattern when they combine in the coupler 26. Changes in the parameter being monitored change the interference pattern. The changes in the interference pattern are measured to provide information indicative of changes in the physical parameter being monitored.

The portion of the optical signal from the optical signal source 18 that remains in the optical fiber 20 propagates through a fiber optic delay coil 50 to a fiber optic coupler 52. A first portion of the light from the optical signal source that reaches the fiber optic coupler 52 remains in the optical fiber 20, and a second portion of the source light couples into the optical fiber 42 and propagates to the fiber optic accelerometer 12.

The fiber optic accelerometer 12 may also be formed as a Michelson interferometer. The light coupled into the fiber optic accelerometer 12 propagates in the optical fiber 42 to the fiber optic coupler 54, which divides the source light into two beams. A first beam remains in the optical fiber 42, and a second beam cross-couples into an optical fiber 56. The beam remaining in the optical fiber 42 propagates through a delay coil 58 to a sensing coil 60. The sensing 60 coil may be formed by wrapping the optical fiber 42 around a mandrel 61.

After propagating through the delay coil 58, the optical signal then reflects from a mirror 62 mounted on the end of the optical fiber 42. This reflected signal then propagates back through the sensing coil 60 and the delay coil 58 to the fiber optic coupler 54. The fiber optic coupler 54 cross-couples part of the light reflected from the mirror 62 into the optical fiber 56, and this light then is either absorbed or allowed to propagate out of the fiber optic sensing system at the end 64 of the optical fiber 56.

The portion of the light from the fiber optic coupler 52 that is cross-coupled into the optical fiber 56 at the fiber optic coupler 54 propagates through a reference coil 63 to a mirror 66 mounted on the end of the optical fiber 56. The reference coil 63 may be formed by wrapping the optical fiber 56 around a mandrel 65. Light reflected from the mirror 66 propagates back through the reference coil 63 to the fiber optic coupler 54. Part of the light reflected from the mirror 66 travels through the fiber optic coupler 54 to the end 64 of the optical fiber 56 where this light is then also either absorbed or allowed to propagate out of the fiber optic sensing system 10.

Part of the light reflected from the mirror 66 cross-couples at the fiber optic coupler 54 and combines with light reflected from the mirror 62 to form an interference pattern that is the optical output of the fiber optic accelerometer 12. The optical signal carrying the output of the fiber optic accelerometer 12 then propagates to the fiber optic coupler 52, which allows part of the output of the fiber optic accelerometer 12 to remain in the optical fiber 42 and propagate to the fiber optic coupler 40. The fiber optic coupler 40 then allows part of the output of the fiber optic accelerometer 12 to remain in the optical fiber 42 and propagate to the detector 44.

The part of the source signal that remains in the optical fiber 20 after the fiber optic coupler 52 propagates through a delay coil 69 and then impinges upon the fiber optic accelerometer 14. The fiber optic accelerometer 14 is formed substantially the same as the fiber optic accelerometer 12. The only essential difference between the two fiber optic accelerometers 12 and 14 is that they have perpendicular sensing axes as explained subsequently with reference to FIG. 3.

The light input into the fiber optic accelerometer 14 impinges upon a fiber optic coupler 70, which divides the source light into two beams. A first beam remains in the optical fiber 20, and a second beam cross-couples into an optical fiber 72. The beam remaining in the optical fiber 20 propagates through a delay coil 74 to a sensing coil 76. The sensing 76 coil may be formed by wrapping the optical fiber 20 around a mandrel 77. After propagating through the delay coil 76, the optical signal then reflects from a mirror 78 mounted on the end of the fiber optic 20. This reflected signal then propagates back through the sensing coil 76 and the delay coil 74 to the fiber optic coupler 70. The fiber optic coupler 70 cross-couples part of the light reflected from the mirror 78 into the optical fiber 72, and this light then is either absorbed or allowed to propagate out of the fiber optic sensing system at the end 85 of the optical fiber 72.

The portion of the light from the fiber optic coupler 52 that is cross-coupled into the optical fiber 72 at the fiber optic coupler 70 propagates through a reference coil 80 to a mirror 82 mounted on the end of the optical fiber 72. The sensing 80 coil may be formed by wrapping the optical fiber 72 around a mandrel 83. Light reflected from the mirror 82 propagates back through the reference coil 80 to the fiber optic coupler 70. Part of the light reflected from the mirror 82 travels through the fiber optic coupler 70 to the end 85 of the optical fiber 72 where this light is then also either absorbed or allowed to propagate out of the fiber optic sensing system 10.

Part of the light reflected from the mirror 82 cross-couples at the fiber optic coupler 70 and combines with light reflected from the mirror 78 to form an interference pattern that is the optical output of the fiber optic accelerometer 14. The optical signal carrying the output of the fiber optic accelerometer 14 then propagates to the fiber optic coupler 52, which cross-couples part of the output of the fiber optic accelerometer 14 into the optical fiber 42. This cross-coupled signal then propagates to the fiber optic coupler 40. The fiber optic coupler 40 then allows part of the output of the fiber optic accelerometer 14 to remain in the optical fiber 42 and propagate to the detector 44.

Referring to FIG. 3, the fiber optic sensing system includes a housing 86 which serves several functions. The housing 86 includes a generally cylindrical base 86A and a cap 86B that is preferably threadedly mounted to the base 86A. The housing 86 acts a neutrally buoyant body in water, which causes the fiber optic accelerometers 12 and 14 to act as hydrophones. The buoyancy of the fiber optic sensing system 10 may be adjusted by adding weights inside the housing 86. The volume of the housing may be adjusted by advancing or retracting the cap 86B on threads 86C formed on the open end of the base 86A. The housing 86 provides a common mounting location for the omnidirectional hydrophone 16. The fiber optic accelerometers 12 and 14 are mounted inside the housing 86. The housing 86 also provides protection for the delicate optical circuits from the underwater environment and exposure to static pressure.

Referring to FIG. 3, the omnidirectional hydrophone 16 may comprise a thin-walled mandrel 87 that is a portion of the housing 86. The optical fiber 32 may be wrapped around the mandrel 87 to form the sensing coil 34. Using part of the housing 86 as the mandrel 87 for the omnidirectional hydrophone 16 results in a compact, rugged structure with excellent protection for the fiber 20 as it leads into the housing 86.

Figure 4:
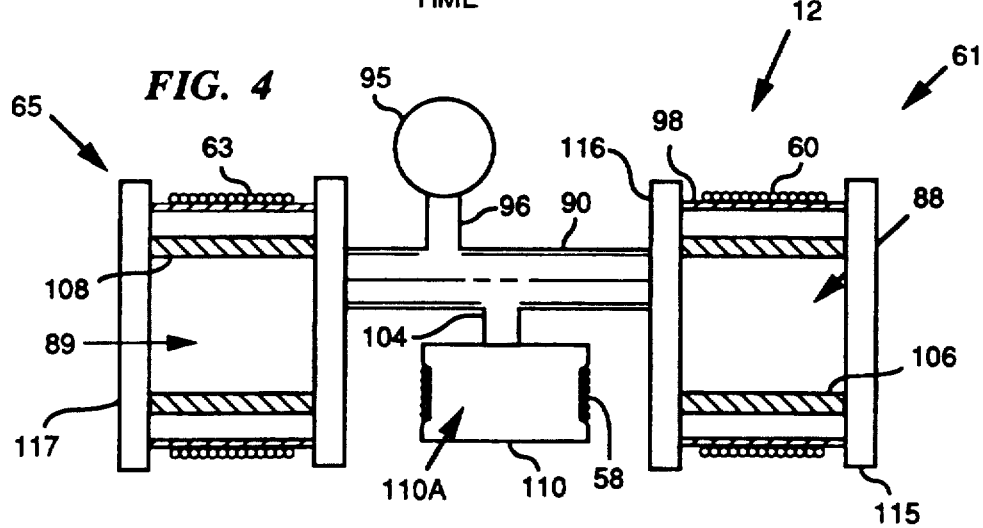
FIG. 4 is a cross sectional view of a gradient sensor that may be included in the fiber optic sensing system of FIG. 1.

Referring to FIGS. 1, 3 and 4, the fiber optic accelerometers 12 and 14 are formed to be substantially identical. Therefore, only the fiber optic accelerometer 12 is described in detail. The mandrels 61 and 65 are generally cylindrical and include chambers 88 and 89, respectively shown in FIG. 4. A tube 90 connects the chambers 88 and 89 to place them in fluid communication. The optical fiber 42 is wrapped around the mandrel 61, and the optical fiber 56 is wrapped around the mandrel 65. The delay coil 58 in the fiber 42 is wrapped around a spool 110 that is connected to the tube 90 via a tube 104 to place a chamber 110A in the spool 110 in fluid communication with the chambers 88 and 89.

The mandrel 61 preferably has thin walls and is mounted on a support structure 108 that is attached to an end of the tube 90. The mandrel 65 is formed substantially identically with the mandrel 61 and is mounted on a support structure 106 that is attached to the tube 90 at an end thereof opposite the mandrel 61. The mandrels preferably use thin-walled cylinders capped with two end plates 115 and 116, respectively, that are joined by a pair of cylindrical support structures 106 and 108. The support structure 106 carries the mechanical load on the mandrel 61 while the end plates 115 and 116 seal the volume enclosed by the mandrel 61. The tube 90 is preferably off-center on the mandrels 61 and 65, which allows the two fiber optic accelerometers 12 and 14 to be nested together in asymmetrical arrangement with a compact housing.

The chambers 88, 89 and the tube 90 share a common fill fluid. This configuration causes an acceleration along the longitudinal axis of the tube 90 to cause a pressure decrease in one of the chamber 88 and 89 and a pressure increase in the other chamber. The optical fibers 42 and 56 each comprises one side of an interferometer, which results in a differential output by adding the magnitudes of the opposite effects of the acceleration on the two mandrels 61 and 65.

A volume expansion bladder 95 is in fluid communication with the chambers 88 and 89 and the tube 90 via an opening 96 formed in the side of the tube 90. The volume expansion bladder 95 compensates for differences between the thermal expansion coefficients of the mandrels 61 and 65 and the fill fluid. Fill fluids typically have higher thermal expansion coefficients than the materials used for forming the mandrels 61 and 65. Without volume compensation, the performance of the fiber optic sensing system 10 varies considerably with temperature. Differential expansion of the fluid and the mandrels 61 and 65 may cause undesired pressure differences and voids within the region enclosed by the chambers and the tube. With the volume compensation device 95 included therein, the fiber optic sensing system 10 is very stable for the range of temperature variations usually encountered in underwater applications.

Referring to FIG. 5, an omnidirectional, passive fiber optic sensor 111 that may be included in the fiber optic sensing system 10 includes three tubes 112–114 preferably formed of a material such as nylon. In a presently preferred embodiment of the invention, the tube 112 has a length of 120 cm and the tubes 113 and 114 have lengths of 13.3 cm. Referring to FIGS. 5 and 6, a spacer 116, preferably formed of neoprene, is placed between the tubes 112 and 113, and a similar spacer 118 is placed between the tubes 113 and 114.

The fiber optic sensor 111 may include a mismatched pathlength Michelson fiber optic interferometer similar to that disclosed in U.S. Pat. No. 4,848,906, to Layton, which is hereby incorporated by reference into the present disclosure.

Referring to FIG. 5, the fiber optic sensor 111 includes a sensing fiber 120 and a reference fiber 122. A 2×2 coupler 124 is mounted to the tube 112 near an end 126 for coupling light between the sensing fiber 120 and the reference fiber 122.

A first slot 128 extends longitudinally along the tube 112 from the coupler 124 to the other end 130 of the tube 112. A second slot 132 extends the entire length of the tube 113, and a third slot 134 extends the entire length of the tube 114. The tubes 112–114 are placed end-to-end with the slots 138, 132 and 134 aligned with each other.

Referring to FIG. 5, both the sensing fiber 120 and the reference fiber 122 extend from the coupler 124 and are placed in the slot 128. A few centimeters from the coupler 124, the sensing fiber 120 is led out of the slot 128 and wrapped around the tube 112 to form a first sensing coil section 136 that extends along the length of the tube 112 for about 3 cm. The first sensing coil section 136 has a very small pitch. A portion 140 of the sensing fiber 120 is then wound on the tube 112 with a pitch much greater than the pitch of the coils in the first fiber coil 136. The sensing fiber 120 is then would on the tube 112 to form a second sensing coil section 142 that is essentially identical to the sensing coil section 136. The distance along the tube 112 between the first and second coil sections 136 and 142 may conveniently be about 0.5 cm. The second sensing coil section 142 ends near the end 130 of the tube 112.

Referring to FIGS. 5 and 6, a portion 122A of the reference fiber 122 is led from the slot 128 near the end 130 of the tube 112. The sensing fiber 120 and the reference fiber 122 are then placed closely together and wrapped around the spacer 116. The pitch of the wraps of the combined sensing fiber 120 and reference fiber 122 around the spacer 116 is preferably much greater than the pitch of the wraps of the sensing fiber 120 around the tube 112 to form the sensing coil sections 136 and 142.

Still referring to FIGS. 5 and 6, the sensing fiber 120 and the reference fiber 122 are separated gain after they are wrapped around the spacer 116. A portion of the reference fiber 122 is placed in the slot 132 in the tube 114; and the sensing fiber 120 is wrapped around the tube 113 to form third and fourth sensing coil sections 150 and 152, which are essentially identical to the sensing coil sections 136 and 142.

The sensing fiber 120 and the reference fiber 122 are then held together and wrapped around the spacer 118 in the same way as they are wrapped around the spacer 116. After being wrapped around the spacer 118, the reference fiber 122 is placed in the slot 134 in the tube 114. The sensing fiber 120 is then wrapped around the tube 114 to form fifth and sixth sensing coil sections 160 and 162, respectively. Thus the sensing fiber 120 is wrapped around the tubes 112–114 in a manner that cancels out acceleration noise while allowing the fiber optic sensor 111 to operate in an extended mode.

When the sensing fiber 120 and the reference fiber 122 cross together between adjacent tubes, the fibers experience essentially the same stress, which cancels out noise generated at the interfaces between the tubes. Instead of being in the slots 128, 132 and 134, the reference fiber 122 may be wrapped with the sensing fiber 120, but in a much larger pitch, to cancel out acceleration noise generated in the sensing fiber 120.

Referring to FIG. 5, a mirror slot 168 is formed at the end 170 of the fiber optic sensor 111 where the slot 134 ends. The sensing fiber 120 and the reference fiber 122 are both secured in the slot 134 so that the fibers extend into the mirror slot 168. A small mirror 176 connected to the end of the sensing fiber 120 reflects light emitted from the sensing fiber 120 back to the coupler 124.

Similarly, a small mirror 178 connected to the reference fiber 122 reflects light emitted form the reference fiber 122 back toward the coupler 124. The light beams then combine in the coupler 124 to produce an interference pattern.

The fiber optic sensor 111 operates with light from a light source such as the optical source 18 of FIG. 1. Light pulses are injected into the input fiber of the sensor 111. For purposes of explaining the method of operation of the fiber optic sensor 111, the input fiber is assumed to be the sensing fiber 120. The coupler 124 then divides the input light into two beams of substantially equal intensity so that both the sensing fiber 120 and the reference fiber 122 guide light pulses from the light source. The optical path through the sensing fiber 120 preferably is considerably longer than the optical path through the reference fiber 122. The fiber optic sensor 111 has been found to function satisfactorily when the pathlength difference is about 73 meters.

The input light travels to the mirrors 176 and 178 and reflects back to the coupler 124, which combines the optical signals directed toward it from the sensing fiber 120 and the reference fiber 122. The signals in the sensing fiber 120 and the reference fiber 122 have a definite phase relationship when they exit the coupler 124. The lengths of the sensing fiber 120 and the reference fiber 122 change length as they are exposed to an acoustic field. These changes in length cause phase changes in the optical signals in the sensing fiber 120 and reference fiber 122. If the length of one of the arms of the interferometer changes more than the length of the other, then a signal is generated when the beams recombine in the coupler 124. The generated optical signal may then be guided to the detector 44 for producing electrical signals that may be processed to determine the magnitude of the acoustic disturbance that generated the signal.

Prior art fiber optic gradient hydrophones include equal path length interferometers. Equal path length interferometers necessitate specialized optical signal sources and complex demodulation techniques for operation in a remote, passive configuration. The present invention maintains equal acoustic sensitivity in each arm of the fiber optic accelerometers 12 and 14, but provides differing optical delay in the two arms that comprise each fiber optic accelerometer. This same feature is incorporated into the omnidirectional hydrophone 16 by the use of an unbalanced interferometer in which the longer path performs acoustic sensing while the shorter path provides a reference.

Referring to FIGS. 1 and 4, having a portion of the optical fiber 42 wound around the delay spool 110 causes the returned optical pulses from the two arms of the accelerometer 12 to be well-separated in time. This time separation between the pulses output from the optical fibers 42 and 56 permits application of a carrier phase modulation on one pulse and not on the other prior to detection of the pulses at the photodetector 44. Application of carrier phase modulation allows the use of conventional demodulation techniques for determining changes in the physical parameter being monitored.

The delay spool 110 of the accelerometer 12 is mounted in a manner such the delay coil 58 is insensitive to the acceleration of the field of interest. The coils 60 and 63 are preferably substantially identical and have essentially equal sensitivities to acceleration. Similarly, the delay coil 74 is insensitive to the field of interest, and the coils 76 and 80 are substantially identical.

The present invention is less massive than previous designs that use a sensing mandrel surrounded by a fluid. The present invention has the advantage of isolating the optical circuit form the fill fluid, which relaxes the environmental tolerance required of the optical components.

The structures and methods disclosed herein illustrate the principles of the present invention. The invention may be embodied in other specific forms without departing from its spirit or essential characteristics. Therefore, the described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A fiber optic acoustic sensing system, comprising:
   a housing formed generally as an elongate hollow cylinder; an omnidirectional sensor comprising:
   a sensing fiber wrapped around the housing and exposed to an acoustic field;
   a reference fiber isolated from the acoustic field;
   means for introducing optical signals into the sensing and reference fibers;
   means for combining optical signals output from the sensing and reference fibers to form an interference pattern that is indicative of changes in the acoustic field;
   a first unequal path length fiber optic interferometer, comprising:
   a first mandrel affixed inside the housing the formed to enclose a first chamber;
   a first optical fiber wrapped around the first mandrel to form a first optical fiber coil;
   a second mandrel placed in the housing and formed to enclose a second chamber;
   a second optical fiber wrapped around the second mandrel to form a second optical fiber coil;
   a fluid filling both the first and second chambers;
   means for placing the first and second chambers in fluid communication and defining a sensing axis between the first and second mandrels such that acceleration of the housing along the first sensing axis causes a fluid pressure differential on the first and second optical fiber coils;
   means for introducing optical signals into the first and second optical fibers;
   means for combining optical signals output from the first and second optical fibers to produce a signal indicative of the component of the acoustic field along the first sensing axis; and
   a second unequal path length fiber optic interferometer affixed inside the housing nd formed essentially identical to the first unequal path length fiber optic interferometer but having a second sensing axis perpendicular to the first sensing axis.

2. The fiber optic acoustic sensing system of claim 1 wherein the housing has a volume that is adjustable for controlling the buoyancy thereof.

3. The fiber optic acoustic sensing system of claim 1, further comprising means for compensating for differential thermal expansion of the mandrels and the fluid that fills the first and second chambers.

4. The fiber optic acoustic sensing system of claim 1, further comprising a delay coil formed in the first optical fiber so that the first optical fiber has a longer optical path length than the second optical fiber.

5. A fiber optic acoustic sensing system, comprising:
a first optical fiber;
an optical signal source arranged to introduce optical signals into the first optical fiber;
a first mismatched path length fiber optic interferometer optically coupled to the first optical fiber and configured to form an omnidirectional acoustic sensor;
a second mismatched path length fiber optic interferometer optically coupled to the first optical fiber and configured to form a first hydrophone having a first sensing axis;
a third mismatched path length fiber optic interferometer optically coupled to the first optical fiber and configured to form a second hydrophone for producing optical signals indicative of having a second sensing axis that is perpendicular to the first sensing axis; and
a detector optically coupled to the omnidirectional acoustic sensor and to the first and second hydrophones for converting optical signals output therefrom to electrical signals indicative of the magnitude and direction of changes in an acoustic field.

6. The fiber optic acoustic sensing system of claim 5, further comprising a housing, the omnidirectional acoustic sensor being formed to include a length of optical fiber wrapped around the housing and the first and second hydrophones being affixed inside the housing.

7. The fiber optic acoustic sensing system of claim 5 wherein the housing has a volume that is adjustable for controlling the buoyancy thereof.

8. The fiber optic acoustic sensing system of claim 5, wherein the first hydrophone comprises:
a first mandrel affixed inside the housing and formed to enclose a first chamber;
a first optical fiber coil formed on the first mandrel;
a second mandrel placed in the housing and formed to enclose a second chamber;
a second optical fiber coil formed on the second mandrel;
a fluid filling both the first and second chambers;
means for placing the first and second chambers in fluid communication and defining the first sensing axis between the first and second mandrels such that acceleration of the housing along the first sensing axis causes a fluid pressure differential on the first and second optical fiber coils;
means for introducing optical signals into the first and second optical fiber coils;
means for combining optical signals output from the first and second optical fibers to produce a signal indicative of the component of the acoustic field along the first sensing axis; and
a second unequal path length fiber optic interferometer affixed inside the housing to define a second sensing axis perpendicular to the first sensing axis.

9. The fiber optic acoustic sensing system of claim 8, further comprising means for compensating for differential thermal expansion of the mandrels and the fluid that fills the first and second chambers.

10. A method for forming a fiber optic acoustic sensing system, comprising the steps of:
forming a housing generally as an elongate hollow cylinder;
forming an omnidirectional sensor by a process that comprises the steps of:
wrapping a sensing fiber around the housing;
exposing the sensing fiber to an acoustic field;
isolating a reference fiber from the acoustic field;
introducing optical signals into the sensing and reference fibers;
combining optical signals output from the sensing and reference fibers to form an interference pattern that is indicative of changes in the acoustic field;
forming a first unequal path length fiber optic interferometer by a process that comprises the steps of:
affixing a first mandrel inside the housing;
forming the first mandrel to enclose a first chamber;
wrapping a first optical fiber around the first mandrel to form a first optical fiber coil;
affixing a second mandrel inside the housing;
forming the second mandrel formed to enclose a second chamber;
wrapping a second optical fiber around the second mandrel to form a second optical fiber coil;
filling both the first and second chambers with a fluid;
placing the first and second chambers in fluid communication and defining a sensing axis between the first and second mandrels such that acceleration of the housing along the first sensing axis causes a fluid pressure differential on the first and second optical fiber coils;
introducing optical signals into the first and second optical fibers;
combining optical signals output from the first and second optical fibers to produce a signal indicative of the component of the acoustic field along the first sensing axis; and
affixing a second unequal path length fiber optic interferometer inside the housing to define a second sensing axis perpendicular to the first sensing axis.

11. The method of claim 10 including the step of forming the housing to have a volume that is adjustable for controlling the buoyancy thereof.

12. The method of claim 10, further comprising the step of compensating for differential thermal expansion of the mandrels and the fluid that fills the first and second chambers.

13. The method of claim 10, further comprising the step of forming a delay coil in the first optical fiber so that the first optical fiber has a longer optical path length than the second optical fiber.

14. A method for forming a fiber optic acoustic sensing system, comprising the step of:
providing a first optical fiber;
arranging an optical signal source to introduce optical signals into the first optical fiber;
optically coupling a first mismatched path length fiber optic interferometer to the first optical fiber;
configuring the first mismatched path length fiber optic interferometer to form a first omnidirectional acoustic sensor;
optically coupling a second mismatched path length fiber optic interferometer to the first optical fiber;

configuring the second mismatched path length fiber optic interferometer to form a first hydrophone having a first sensing axis;

optically coupling a third mismatched path length fiber optic interferometer to the first optical fiber;

configuring the third mismatched path length fiber optic interferometer to form a second hydrophone having a second sensing axis that is perpendicular to the first sensing axis; and optically coupling a detector to the omnidirectional acoustic sensor and to the first and second hydrophones for converting optical signals output therefrom to electrical signals indicative of the magnitude and direction of changes in an acoustic field.

15. The method of claim 14, further comprising the steps of:

providing a housing;

forming the omnidirectional acoustic sensor to include a length of optical fiber wrapped around the housing; and affixing the first and second hydrophones inside the housing.

16. The method of claim 15 including the step of adjusting the volume of the housing for controlling the buoyancy thereof.

17. The method of claim 14, wherein the first hydrophone is formed by a process that includes the steps of:

affixing a first mandrel inside the housing;

forming the first mandrel formed to enclose a first chamber;

wrapping a first optical fiber around the first mandrel to form a first optical fiber coil;

affixing a second mandrel inside the housing;

forming the second mandrel to enclose a second chamber;

wrapping a second optical fiber around the second mandrel to form a second optical fiber coil;

filling both the first and second chambers with a fluid;

placing the first and second chambers in fluid communication and defining a sensing axis between the first and second mandrels such that acceleration of the housing along the first sensing axis causes a fluid pressure differential on the first and second optical fiber coils;

introducing optical signals into the first and second optical fiber coils;

combining optical signals output from the first and second optical fiber coils to produce a signal indicative of the component of the acoustic field along the first sensing axis; and affixing a second unequal path length fiber optic interferometer inside the housing to define a second sensing axis perpendicular to the first sensing axis.

18. The method of claim 17, further including the step of compensating for differential thermal expansion of the mandrels and the fluid that fills the first and second chambers.

19. A fiber optic acoustic sensing system, comprising:

a first optical fiber;

an optical signal source arranged to introduce optical signals into the first optical fiber;

a first mismatched path length fiber optic interferometer optically coupled to the first optical fiber to receive optical signals therefrom and configured to form an omnidirectional acoustic sensor;

a second mismatched path length fiber optic interferometer optically coupled to the first optical fiber to receive optical signals therefrom and configured to form a first gradient hydrophone having a first sensing axis;

a third mismatched path length fiber optic interferometer optically coupled to the first optical fiber to receive optical signals therefrom and configured to form a second gradient hydrophone having a second sensing axis that is perpendicular to the first sensing axis; and a detector optically coupled to the omnidirectional acoustic sensor and to the first and second gradient hydrophones for converting optical signals output therefrom to electrical signals indicative of the magnitude and direction of changes in an acoustic field.

20. The fiber optic acoustic sensing system of claim 19 further comprising:

means for providing a first predetermined signal delay in the first gradient hydrophone; and means for providing a second predetermined signal delay in the second gradient hydrophone.

* * * * *